US009826860B2

(12) United States Patent
Hanson et al.

(10) Patent No.: US 9,826,860 B2
(45) Date of Patent: Nov. 28, 2017

(54) FOOD STORAGE CONTAINER AND STRAINER DEVICE

(71) Applicants: Eric P. Hanson, Warren, NJ (US); Jennifer L. Grogan, Edison, NJ (US)

(72) Inventors: Eric P. Hanson, Warren, NJ (US); Jennifer L. Grogan, Edison, NJ (US)

(*) Notice: Subject to any disclaimer, the term of this patent is extended or adjusted under 35 U.S.C. 154(b) by 203 days.

(21) Appl. No.: 14/545,322

(22) Filed: Apr. 22, 2015

(65) Prior Publication Data

US 2016/0309962 A1 Oct. 27, 2016

(51) Int. Cl.
A47J 47/10 (2006.01)
B65D 25/04 (2006.01)
B65D 81/26 (2006.01)
B65D 43/02 (2006.01)

(52) U.S. Cl.
CPC .............. *A47J 47/10* (2013.01); *B65D 25/04* (2013.01); *B65D 43/0204* (2013.01); *B65D 81/261* (2013.01)

(58) Field of Classification Search
CPC ... A47J 47/10; B65D 81/261; B65D 43/0204; B65D 25/04
USPC ............... 210/464, 470, 473, 474, 477, 482
See application file for complete search history.

(56) References Cited

U.S. PATENT DOCUMENTS

| | | | | |
|---|---|---|---|---|
| 1,709,383 A | * | 4/1929 | Wesbecher | A47J 47/20 4/290 |
| 2,033,285 A | * | 3/1936 | Harvey | A47J 47/20 210/541 |
| D188,730 S | * | 8/1960 | Berman | D7/667 |
| 3,199,438 A | * | 8/1965 | Myler | A47J 37/041 248/175 |
| 4,989,419 A | * | 2/1991 | Brando | F25D 3/08 62/457.2 |
| 5,656,188 A | * | 8/1997 | Janowiak | A47J 27/13 219/438 |
| 5,904,090 A | * | 5/1999 | Lillelund | F26B 5/08 210/360.1 |
| 5,988,050 A | * | 11/1999 | Foster, Jr. | A47J 47/10 210/241 |
| 7,681,740 B1 | * | 3/2010 | Lange | B01D 29/03 210/236 |

(Continued)

FOREIGN PATENT DOCUMENTS

GB         257746        * 9/1926

*Primary Examiner* — Madeline Gonzalez
(74) *Attorney, Agent, or Firm* — Ernest D. Buff & Assoc., LLC; Ernest D. Buff; Margaret A. LaCroix

(57) ABSTRACT

A container with strainer divider is appointed to filter liquid from a food product to maintain freshness. The liquid strainer divider has a main body portion with a plurality of closely arranged apertures having small diameters. The body portion terminates at a perimeter with a perimeter rim. The perimeter rim and perimeter of the main body portion of the liquid strainer divider are adapted to be received and abut against walls of a container and the plurality of straining holes or apertures of the liquid strainer divider function to separate liquid to the bottom wall of the container. The liquid strainer divider is formed having a plurality of interconnected shallow peaks and valleys, wherein the peaks are formed as a convex arched curve with sloping walls terminating to valleys that are conversely concave arched curves so as to form an interconnected waved structure.

21 Claims, 17 Drawing Sheets

(56) References Cited

U.S. PATENT DOCUMENTS

2007/0095743 A1* 5/2007 Grodecki ............... B01D 29/39
                                                      210/346
2009/0266748 A1* 10/2009 Boris ..................... A23L 7/161
                                                      209/352
2013/0277374 A1* 10/2013 Lewis .................... A47J 36/16
                                                      220/573.4

* cited by examiner

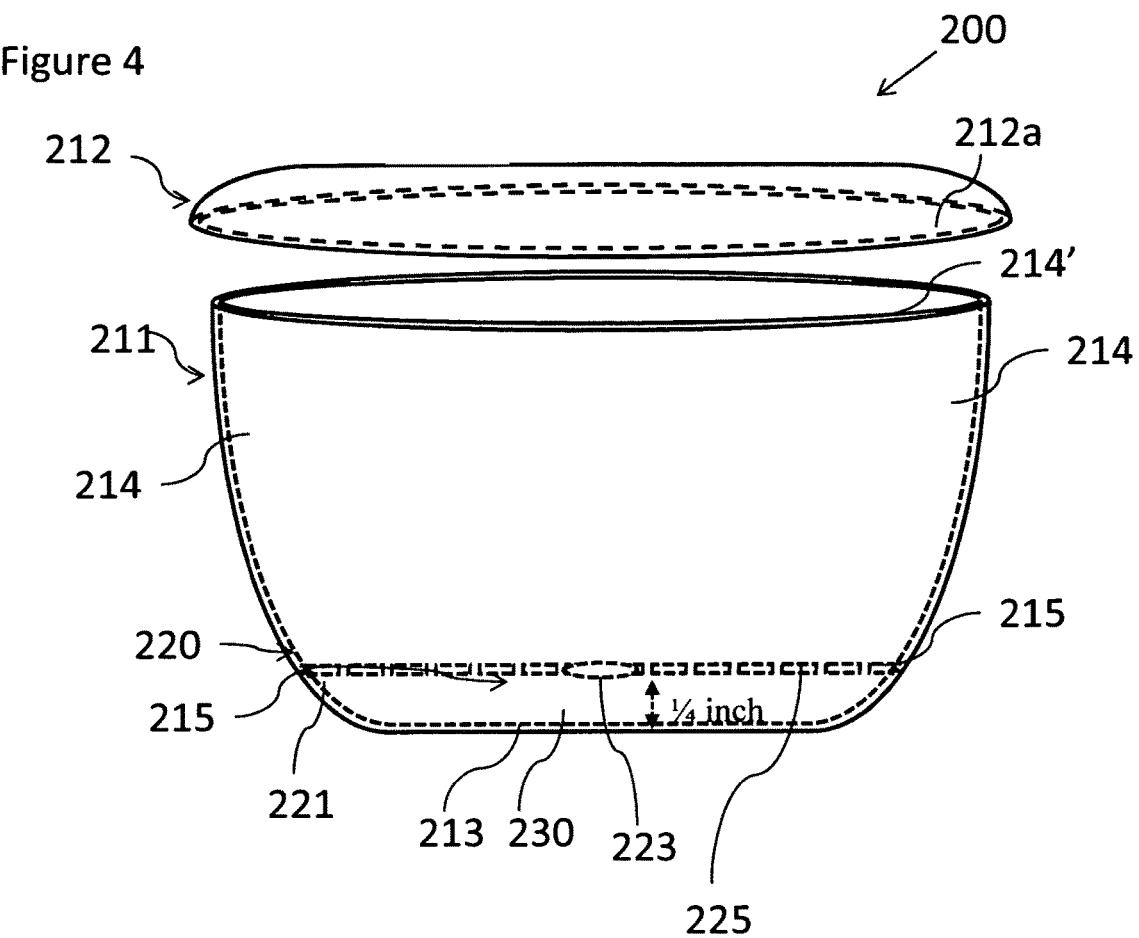

FOOD STORAGE CONTAINER AND STRAINER DEVICE

CROSS-REFERENCE TO RELATED APPLICATIONS

This is a Continuation-In-Part of U.S. application Ser. No. 14/120,081 filed Apr. 23, 2014 for "Food Storage Container and Strainer Device", the disclosure of which is hereby incorporated in its entirety by reference thereto.

BACKGROUND OF THE INVENTION

1. Field of the Invention

The present invention relates to food storage and/or preparation containers; and more particularly, to a bowl or container or vessel that provides for removal or separation of liquids during storage and/or during food preparation.

2. Description of the Prior Art

Food storage is utilized extensively throughout society for distribution, reduction in waste of uneaten or leftover food, preservation, and healthy diet reasons. Oftentimes, when certain foods are stored the liquid in the food tends to pool at the bottom of the storage container. As the food sits in the container, the accumulation of pooled liquid, whether grease, oil, sauces, or water moisture, causes the food to lose freshness and become less edible. In some cases the food can become spoiled and unappetizing in a short period of time. Lettuce, salad, and vegetables in general can become wilted and began to rot earlier than would otherwise result in the absence of the liquid.

Several approaches heretofore known and/or utilized provide devices that provide a generally flat straining surface having a plurality of small holes for liquid to pass through. Various examples of generally flat strainer device apparatus with or without containments can be found in the following: U.S. Pat. No. 2,575,768 to Pearsall discloses a skimmer for skimming grease from the surface of soup and other liquid foods. U.S. Pat. No. 4,040,964 to Hegyi discloses an adjustable container strainer and handle including means for securing the same to various food containers such as cans and a handle to permit easier handling thereof. U.S. Pat. No. 4,680,117 to Freeman discloses a yogurt separator device having in one form a flat blank of filter mesh made of synthetic resin and having openings of from 200 microns to 400 microns in size. U.S. Pat. No. 4,560,475 to Kataoka discloses a filter assembly for providing a filtrate, such as coffee, having a sack of filter paper adhered to the back of a foldable support plate. U.S. Pat. No. 5,035,800 to Kopach discloses a strainer adapted to fit over an opening of a variety of food storage and preparation containers comprising a flexible matrix, a flexible cord which is slidably disposed within a conduit. U.S. Pat. No. 5,148,951 to Moure discloses a dispensing package for gel and semi-solid cleaning and skin care compositions. U.S. Design Pat. No. 5,219,006 to Bishop discloses a method and apparatus for a new and improved strainer funnel aid a cook in separating liquids from solids. U.S. Pat. No. 5,320,031 to Whitney discloses a food processing utensil for straining liquid from food packed in a liquid and for storage of the food product once the liquid is drained. U.S. Design Pat. No. 5,373,779 to Grusin discloses a yogurt cheese making device for separating the whey from yogurt having a strainer which receives the yogurt, the strainer having an open top, a bottom, a pair of opposing end walls, and a pair of opposing side walls. U.S. Patent App. Pub. No. 20120279930 to Iceton discloses a grease separator that includes a strainer bowl and funnel with a sieve in a lower surface. U.S. Patent Application Publication No. 20050205487 to Rogers discloses a combination colander bowl and container set including a colander bowl (a bowl with an integrated strainer and removable bottom plate that can be used as a colander when the bottom plate is removed), a cover that forms an air-tight seal with the bowl, and four snap-on lids that allow the cover, bowl and bottom plate to be used for food storage. U.S. Patent Application Publication No. 20130306646 to Cheng discloses a set of cooking vessels includes two or more fluid containing vessels that nest within each other for compact storage. Foreign Patent Pub. Nos. JPS6423080 and JPS63129281 to Yutaka disclose cooler/preservers for food to facilitate filtering and discharging of the fractions of food by providing a screen for filtering. Non-Patent Literature entitled "*Pyrex Microwave And Oven Safe Food Container With Strainer*" found at http://www.alibaba.com/productgs/1053847261/Pyrex_microwave_and_oven_safe_food.html discloses a microwave and oven safe food container with strainer. Non-Patent Literature entitled "*Healthy Choice® Café Steamers*" found at http://www.healthychoice.com/products/cafe-steamers discloses a microwave and oven safe food container with strainer. Non-Patent Literature "*Marie Collanders® Fresh Favor Steamers*" found at http://www-.mariecallendersmeals.com/steamed-meals discloses a container wherein steam keeps sauce and food separated as the food cooks.

Other approaches heretofore known and/or utilized provide devices having conical or otherwise generally non-flat shaped strainers or filters. Examples can be found in: U.S. Pat. No. 2,456,912 to Burrows discloses a collapsible and adjustable filter and strainer. U.S. Pat. No. 3,861,975 to Hauslein discloses a filtering device including a filter receptacle and a filter element, the inner supporting faces of said filter receptacle and the outer supported faces of said filter element having the shape of identical equilateral triangles forming a pyramid having a quadratic cross-section. Non-Patent Literature entitled "Klip-It® Round Food Storage with Strainers" found at http://www.containerstore.com/shop/?productId=10030078 discloses a food storage container with a strainer that has a built-in handle for insertion and removal from the container.

Despite these and other food storage and straining devices and the like heretofore known and utilized, food storage problems remain paramount. Even with the removal of the majority of liquid from food, as the food sits during storage, more liquid begins to seep out from the food particles. Liquid includes not only water and other aqueous solutions, but oils and grease which coagulate over time. As a result, oftentimes the food product becomes unappetizing and/or the coagulation of the grease and oil on the food particles causes issues during reheating, as well as health issues in consuming fat. While several of these devices are adapted to remove the liquid from food, problems prevail as drainage is oftentimes hindered as food particles clog or cover the small apertures in the strainers. This is especially evident in flat type strainer constructs, which also have problems in removal from the container and proper volume placement of the bottom of the device in relation to the strainer. Even conical shaped or otherwise non-flat type strainers have problematic issues as these devices in general also include a plurality of apertures located on the side walls as well as the bottom wall of the structure. Again, food particles are prone to clogging or covering the apertures, resulting in liquid being trapped in the food.

Notwithstanding the efforts of prior art workers to construct food storage and straining devices and the like, there remains a need in the art for an apparatus and method adapted to help maintain the freshness of foods during storage, or during food preparation. Further, there is a need in the art for a device that provides for the function of storage and/or preparation of food in a manner that filters out or separates liquid from the food product, thereby enabling the food product to remain fresher for a longer period of time.

SUMMARY OF THE INVENTION

The present invention provides a novel container with strainer divider adapted to help maintain the freshness of foods during storage, or during food preparation. Advantageously, the container with strainer divider helps maintain the freshness of food during storage, or during food preparation, by improving the separation of liquid from food. The subject container with strainer divider functions to filter out or separate liquid water, solutions and oils from the food product enabling the food product to remain fresher for a longer period of time and to remove unwanted fats in oil and grease, thereby making the food healthier overall.

In a broad embodiment, a strainer divider is provided that is adapted to fit within a plethora of different containers. The strainer divider comprises: (i) a liquid strainer divider having a main body portion with a plurality of closely arranged apertures having small diameters, the body portion terminating at a perimeter with a perimeter rim; (ii) the perimeter rim and perimeter of the main body portion of the liquid strainer divider being adapted to be received and abut against walls of a container and the plurality of straining holes or apertures of the liquid strainer divider functioning to separate liquid to the bottom wall of the container; and (iii) the liquid strainer divider is formed having a plurality of interconnected shallow peaks and valleys, wherein the peaks are formed as a convex arched curve with sloping walls terminating to valleys that are conversely concave arched curves so as to form an interconnected waved structure. As constructed, the liquid strainer divider functions to separate liquid to the bottom of the container.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 2b is a top view of the liquid strainer divider insert removed from the container of FIG. 2a;

FIG. 3b is a view of an embodiment of the liquid strainer divider, herein shown as a grate or strainer, removed from the container of FIG. 3a;

FIG. 4 is a view of another embodiment of the subject food storage container and/or strainer device.

FIG. 5b is a cross-sectional side view of the food storage container and/or strainer device shown in FIG. 5a;

FIG. 5c is a top view of the liquid strainer divider insert removed from the container of FIG. 5a;

FIG. 5e is a top view of the liquid strainer divider insert removed from the container of FIG. 5a;

FIG. 6b is a cross-sectional side view of the food storage container and/or strainer device shown in FIG. 6a;

FIG. 6c is a top view of the liquid strainer divider insert removed from the container of FIG. 6a.

DETAILED DESCRIPTION OF THE INVENTION

Figure 1A:
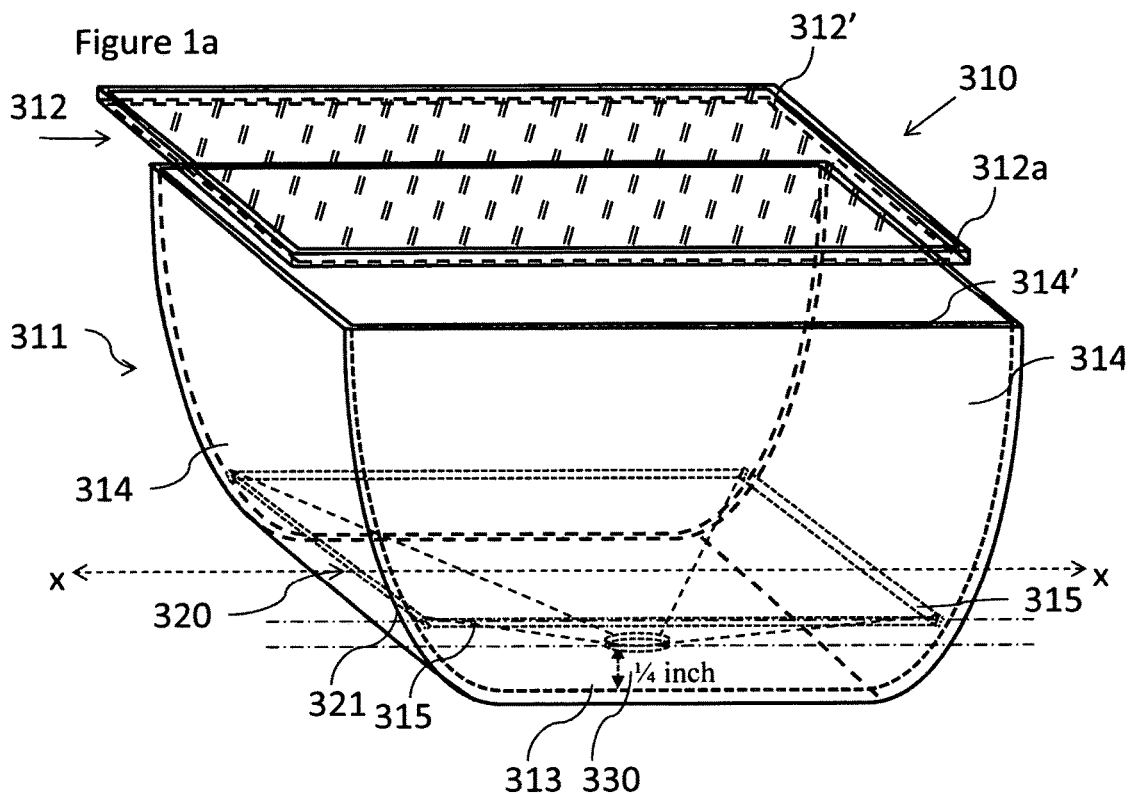
FIG. 1a is a view of another embodiment of the subject food storage container and/or strainer device generally fully assembled and ready for use.

The present invention provides a container with strainer divider appointed to filter liquid from a food product to maintain freshness. Food storage, particularly of fresh foods for example, can pose significant problems when liquid or oil remains in the food. As food several foods, for example salads, sit more water or liquid, or oil (i.e. from a ground meat dish) escapes and pools under the food. In just a short period of time the food can become soggy and wilted, and generally inedible and unappetizing. Oils coagulate and harden, providing an even less appealing food dish. Even still, if one were to stir or reheat the food mixture, the oil would become redistributed on the food, rendering an unhealthy meal. Removal of the liquid, including fats and oils during storage is therefore advantageous.

The present invention provides a device that addresses food storage problems prevalent through the years owing to insufficient drainage and removal and separation of the liquid. In accordance with the present invention there is provided a strainer device that rests within and above the bottom of a food storage vessel. The strainer can have a flat type construct with apertures on a substantially flat surface plane. Drainage of liquid accumulated within food during storage proceeds through apertures in the strainer device to a position of residence within the food storage container that is separated from the food. Inasmuch as the number of apertures in the strainer device is substantial, drainage is not mired if food particles clog or cover some of the small apertures in the strainer device. In such cases, migration of the liquid, albeit somewhat slower, is not prevented; drainage proceeds at a rate sufficient to significantly prolong the shelf life of the container stored food.

While flat type strainer constructs with apertures on a substantially flat surface plane represent a significant advance in the art, the migration of liquid therewithin can be slowed somewhat as liquid accumulates and beads within the strainer apertures during the refrigeration process. Even conical shaped or otherwise non-flat type strainers heretofore disclosed and utilized have encountered reduced-rate migration issues as these devices in general also include a plurality of apertures located within side walls as well as the bottom wall of the structure. Generally, with such constructs, the migration rate of liquid to a separate compartment within the food storage container proceeds at a rate sufficient to significantly prolong the shelf life of food stored therewithin. This beneficial result is afforded by the food storage container and strainer device even though food particles may clog or cover some of the apertures, causing minor amounts of liquid to be trapped in the food.

It has been surprisingly and unexpectedly found that a liquid strainer having a cone shaped body with smooth non-aperture side walls terminating to a central single aperture provides optimal drainage despite having less surface area of apertures. When the liquid strainer divider is in its non-compressed form, as when it is removed from the container, it is generally a flat sheet with fold lines and wall sections lying separated or non-overlapping in relation to one another. Conversely, when the liquid strainer divider is in its compressed form, as when it is inserted within the securing means within the container, it is forced to form the shallow cone shape with sloping side walls at the slope angle θ. The liquid strainer divider is adapted to separate liquid to the bottom wall of the container as it migrates down the sloping side walls through the centrally located aperture.

In another aspect, it has been surprisingly and unexpectedly found that a liquid strainer having an uneven drainage surface or non-flat surface wherein the apertures are not on a flat plan also provide preferred drainage. Specifically, it has been found that a liquid strainer having a planer surface with a plurality of shallow interconnected peaks and valleys, with holes/apertures in the floor thereof, (i.e. similar to an egg-carton construct) yields an uneven or non-flat drainage surface having improved drainage. It has been found that the uneven or non-flat surface via egg crate peaks and valleys provides peaks whereon the food particles or leaves rest while the liquid traverses down the sloped walls into each of the valleys draining through holes within the floor of each of the valleys. As a result, clogged holes or apertures is mitigated as the food particles, i.e. leafy greens, meets and or pasta, predominately rest on the peaks and the liquid drains downward along the sloped walls into the valleys. Preferably, the peaks are rounded peaks and the valleys are also rounded with an aperture/hole therewithin. Grease, oil, water and sauces drain easier and more efficiently, improving storage of the food product.

The subject container with strainer provides a novel apparatus and method adapted to help maintain the freshness of foods while they are stored, or during food preparation. Advantageously, the subject container with strainer provides the ability to store or prepare food in a manner that filters out or separates liquid from the food product, thereby enabling the food product to remain fresher for a longer period of time. FIGS. 1-4 illustrate various embodiments of the subject container with strainer apparatus and method of use thereof.

Figure 1B:
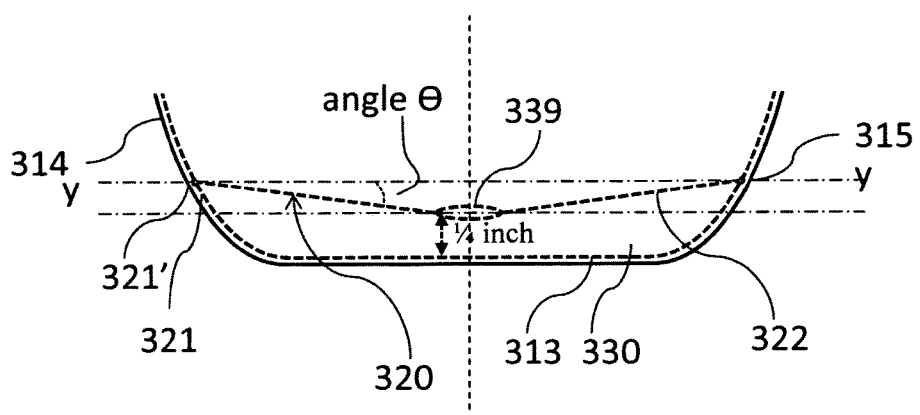
FIG. 1b is a cross-sectional view of the container of FIG. 1a taken along line x-x.
Figure 1C:
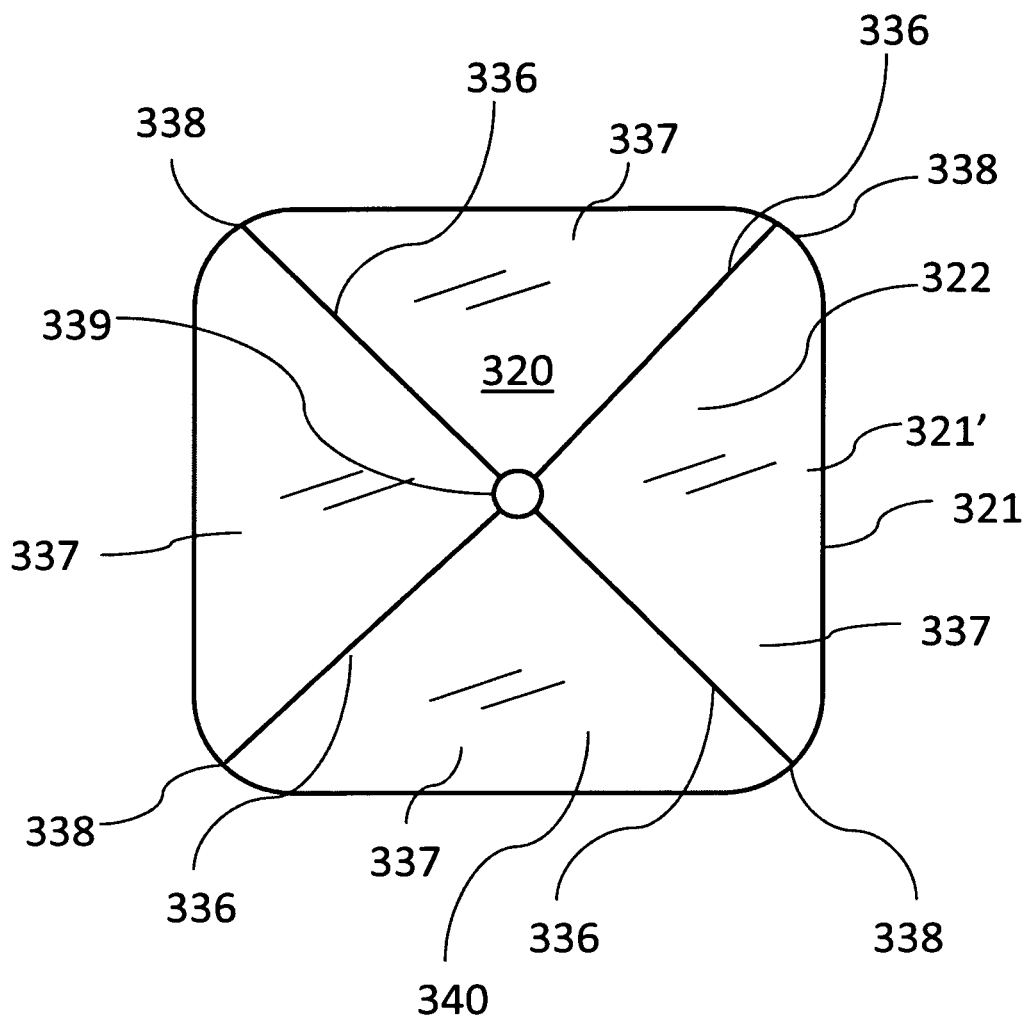
FIG. 1c is a top view of the liquid strainer divider insert removed from the container in its non-compressed generally flat configuration.
Figure 1D:
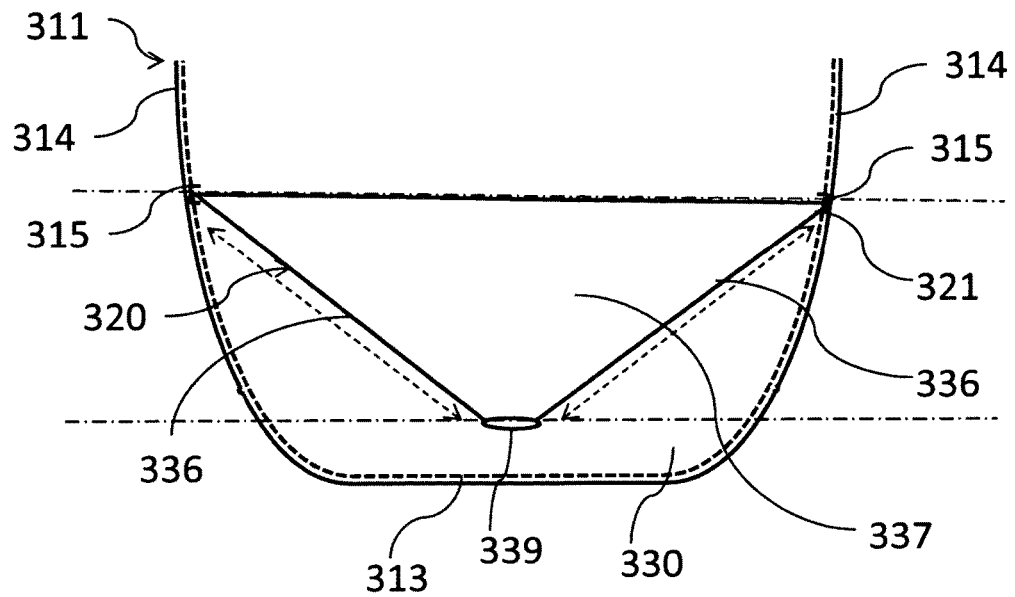
FIG. 1d is a cross-sectional side view showing the liquid strainer divider insert housed in the container in its compressed cone shaped configuration.
Figure 1E:
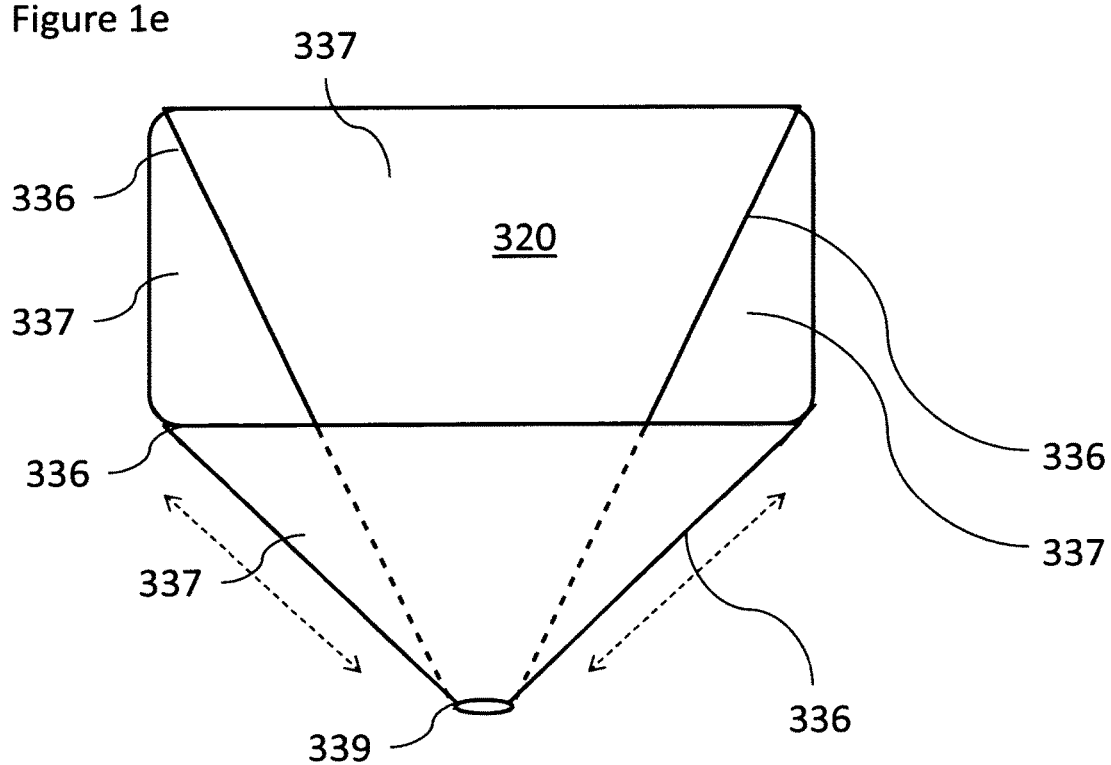
FIG. 1e is a top view of the liquid strainer divider insert in its compressed cone shaped configuration as when it is housed in the container.
Figure 1F:
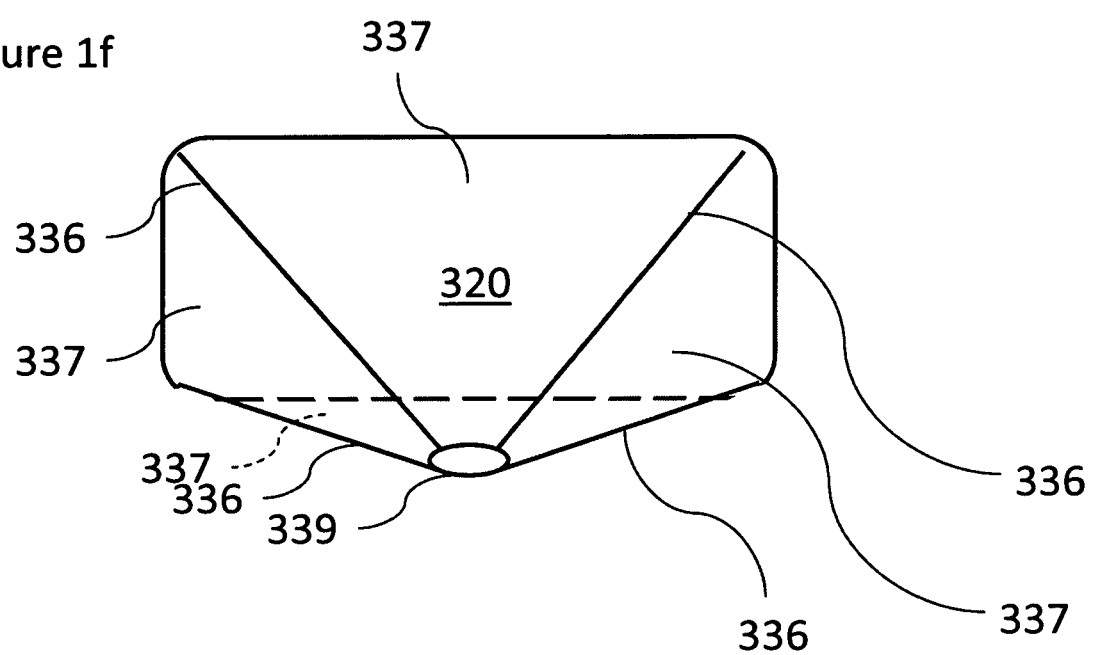
FIG. 1f is a bottom view of the liquid strainer divider insert in its compressed cone shaped configuration as when it is housed in the container.
Figure 1G:
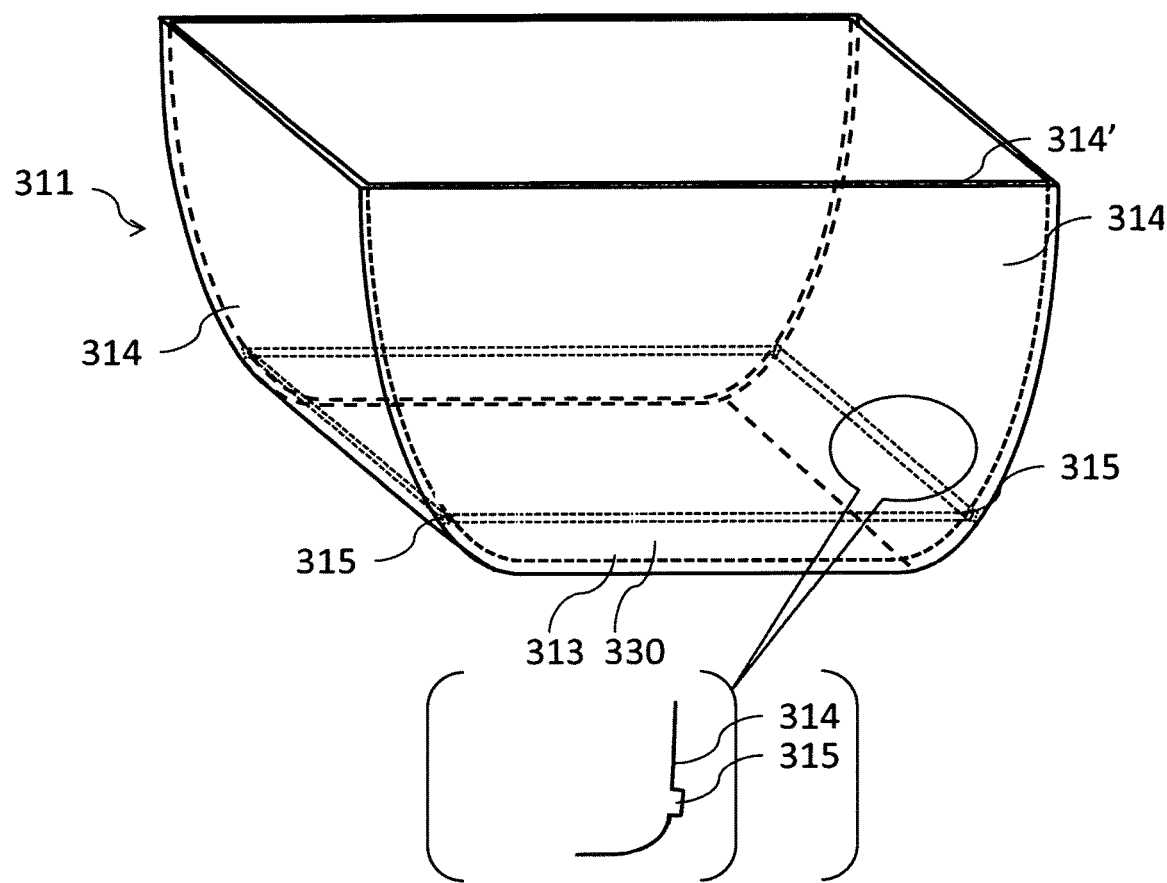
FIG. 1g is a view of the container/vessel with the liquid strainer divider removed from the container showing the side walls and securing means.

FIGS. 1a-1g illustrate another embodiment of the 'Fresh Fit Vessel, shown generally at 310. In the embodiment shown, a liquid strainer divider insert 320 is shown constructed as a shallow cone shape with an opening on the bottom to permit liquid to migrate to the bottom of the container. The shallow cone shaped member is composed of a slippery plastic material, which allows liquid to move freely down and through the aperture at the center of the cone. FIG. 1a shows the container with strainer generally fully assembled and ready for use. FIG. 1b shows a cross-sectional view of the container of FIG. 1a taken along line x-x. FIG. 1c shows a top view of the liquid strainer divider insert 320 when it is removed from the container in its non-compressed generally flat configuration. FIG. 1d shows a cross-sectional side view showing the liquid strainer divider insert 320 housed in the container in its compressed cone shaped configuration. FIG. 1e shows a top view of the liquid strainer divider insert 320 in its compressed cone shaped configuration as when it is housed in the container. FIG. 1f shows a bottom view of the liquid strainer divider insert 320 in its compressed cone shaped configuration as when it is housed in the container. FIG. 1g shows the container/vessel with the liquid strainer divider removed from the container showing the side walls and securing means.

Referring to FIGS. 1a-1g, the container with strainer 310 is generally formed as a container 311 with a lid 312. Lid 312 is appointed to seal container 311 and prevent leakage from the container 311. Container 311 is preferably a plastic container for food storage, and it can come in a plethora of different shapes and sizes. Herein container 311 is generally shown as a rectangular or square container. Container 311 is constructed with a bottom wall 313 and side walls 314. Side walls 314 terminate at a rim or top edge 314' that includes a lip that is adapted to be snapped into a groove 312a within lid 312 for closing and sealing container 311. Side walls 314 include a securing means 315 that is adapted to fit and securingly receive and house a liquid strainer divider 320. Preferably, securing means 315 in side walls 314 is constructed as a groove in at least a portion of each of the side walls 314. More preferably, the groove extends along the interior perimeter of the side walls 314 as a continuous groove circumferentially running continuously along the entire side walls 314. The securing means 315/groove is formed as a notch or groove that is adapted to receive a rim 321 of the liquid strainer divider 320. This securing means 315/circumferentially extending groove is located approximately ¼ inch from the bottom wall 313 of container 311. It is noted that the height from the bottom wall 313 of the container 311 to the securing means 315/circumferentially extending groove may be adjusted depending on the volume of the container itself. That is to say, for smaller containers the distance may be less than ¼ inch, while for larger containers, the distance may be greater than ¼ inch, ranging instead from ¼ inch to 3 inches, for example.

A liquid strainer divider 320 is adapted to be removably received within container 311 by way of the securing means 315/circumferentially extending indenture. The liquid strainer divider 320 in this embodiment is formed with a main body portion 322 having a removal means 323 centrally located therein. The body portion 322 terminates at a perimeter 321' with a perimeter rim 321. In the embodiment shown, the liquid strainer divider 320 is composed of a flexible sheet 335 that includes at least two opposing fold lines 336 forming wall sections 337 and terminating at edges 338 and to an aperture 339 located centrally within sheet 335. Preferably, there are at least four opposing fold lines 336 and visa vie four wall sections 337 as shown (see FIG. 1c for example), terminating at opposing edges 338 and aperture 339. As depicted in FIG. 1c, when liquid strainer divider 320 is in its non-compressed form, as when it is removed from container 311, it is generally a flat sheet with fold lines 336 and walls sections 337 laying separated or non-overlapping in relation to one another. Conversely, when the liquid strainer divider 320 is in its compressed form, as when it is inserted within the securing means 315/groove of container 311, it is forced to form a shallow cone shape with sloping side walls 338 having a slope angle θ ranging from about 10° to about 45° from line y (generally from securing means 315/indenture) [see FIGS. 1a-1b, 1d-1f]. As liquid strainer divider 320 is inserted within container 311 opposing fold lines 336 cause wall sections 337 to converge into the cone shape or converge into angled walls. In turn, the shallow cone-shape that results causes liquid to migrate down the wall sections 337 to aperture 339 to permit liquid to migrate to the bottom of the container 311.

The shallow cone shaped member is preferably composed of a slippery plastic material, which allows liquid to move freely down and through the aperture at the center of the cone. The liquid is then received and held in a bottom cavity 330 of container 311. For securement within the container, liquid strainer divider 320 includes a perimeter rim 321 and perimeter 321' thereof are snapped and received securely and tightly fit within the securing means 315/circumferentially extending groove of container 311. Removal means 323 of strainer 320 is provided as a tab or finger hole/via aperture 339 may be used, wherein a user pulls upward thereon to remove or snap the strainer 320 from the securing means 315/circumferentially extending groove of the container for removal of the strainer 320 from the container 311. In another embodiment the removal means 323 may instead be pull tabs located on or near perimeter rim 321 and/or perimeter 321'. Preferably perimeter rim 321 and perimeter 321' thereof are composed of a resilient yet flexible material so that the perimeter rim 321 and perimeter 321' can be compressed and deformed to snap into/out of the securing means 315/circumferentially extending indenture. The main body portion 322 may be composed of the same material, or may be composed of a more rigid material. Materials contemplated include polymeric materials, rubber, and/silicone materials or combinations thereof. Lid 312 is preferably is aerated for circulation by way of at least one aeration aperture 312', preferably there are a plurality of aeration apertures 312' as illustrated in the figure.

The divider 320 results in a sloped removable drainage floor 340 with a hole/aperture 339 in the center. It is composed of a flexible plastic or silicone that when the sides or four wall sections are clipped into place within the container, the floor of the divider 320 depresses creating an angle for grease/oil/water/liquid to drain to the bottom of the container. The divider 320 floor is composed of a very slick plastic to allow easy drainage. Advantageously, the solid removable floor/divider 320, owing to its small central aperture, allows for the contents to be shaken without the unwanted drainage from returning to the food product located above the divider 320.

Figure 2A:
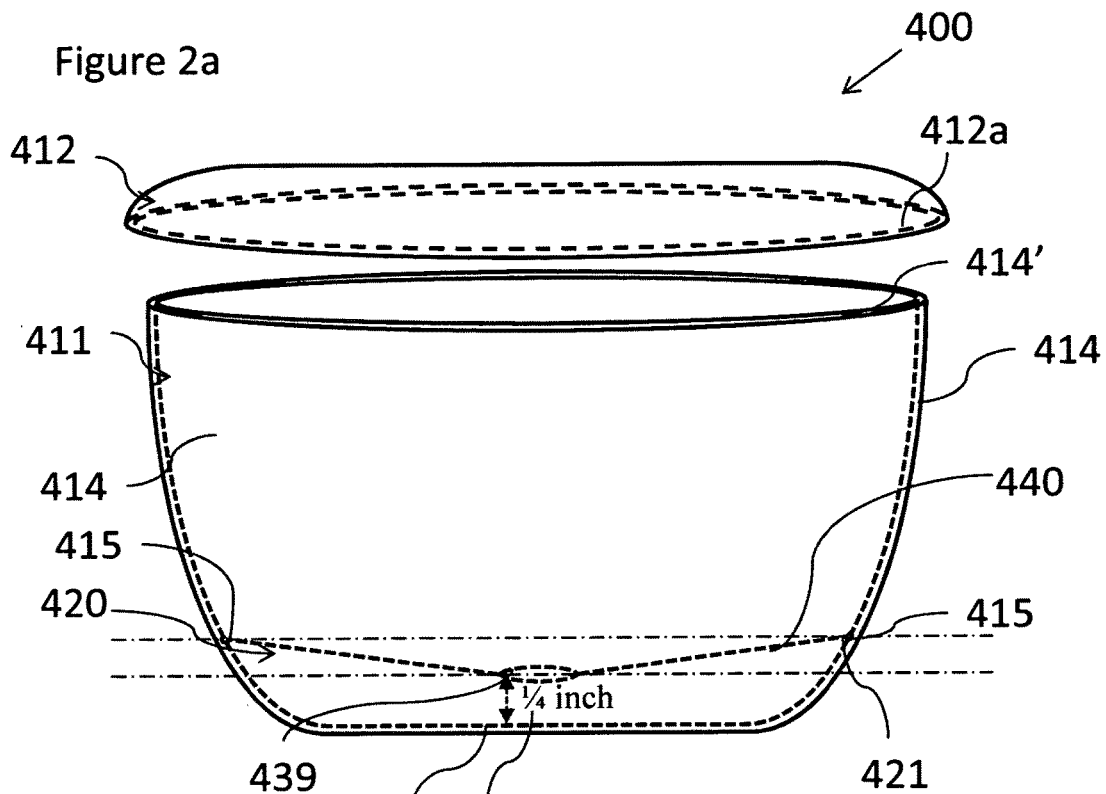
FIG. 2a is a view of another embodiment of the subject food storage container and/or strainer device generally fully assembled and ready for use.
Figure 2B:
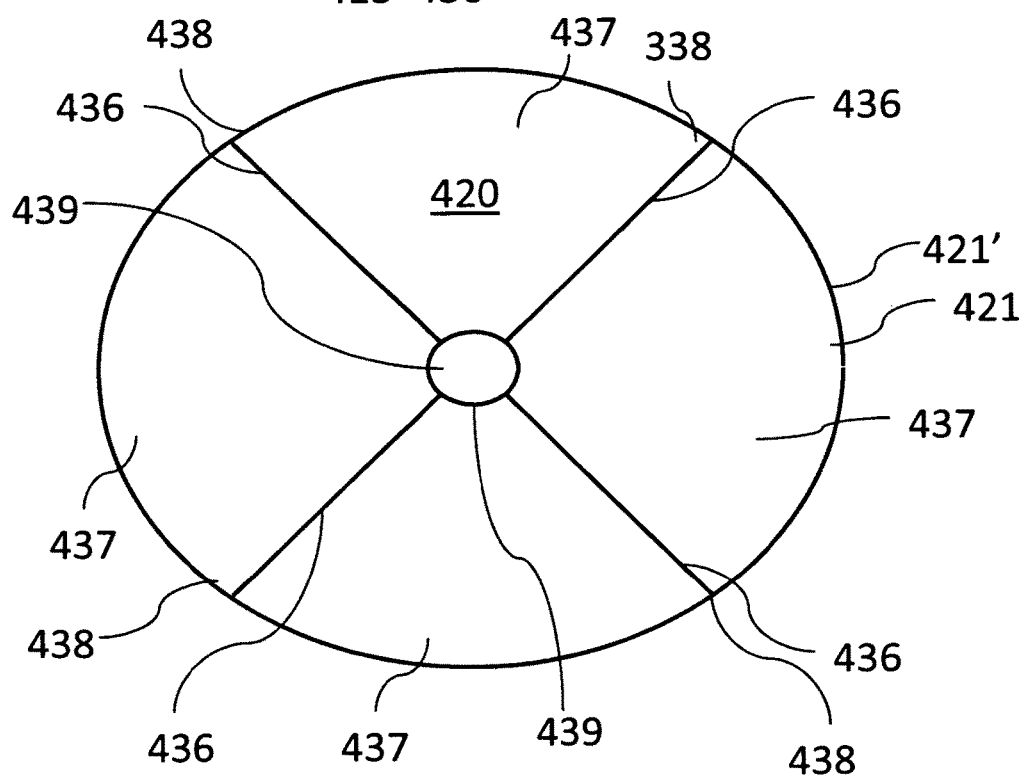

FIGS. 2a-2b illustrate the embodiment of the container with strainer shown generally in FIGS. 1a-1g, however wherein the container is constructed as a round or oval bowl, formed as a container 411 with a lid 412. Like the previous embodiment, container 411 is constructed having a bottom wall 413 and side walls 414 that terminate at a rim or top edge 415 including a lip or closure that is adapted to be snapped into a groove 412a within lid 412. Side walls 414 include a securing means 415 adapted to fit and securing receive and house a liquid strainer divider 420. Preferably, securing means 415 in side walls 414 is constructed as a groove in at least a portion of each of the side walls 414. More preferably, the groove extends along the interior perimeter of the side walls 414 as a continuous groove circumferentially running continuously along the entire side walls 414. The securing means 415/groove is formed as a notch or groove that is adapted to receive a rim 421 of the liquid strainer divider 420. A liquid strainer divider 420 is adapted to be removably received within container 411 by way of the securing means 415/circumferentially extending indenture. The liquid strainer divider 420 is formed as discussed above regarding FIGS. 1a-1g.

Figure 3A:
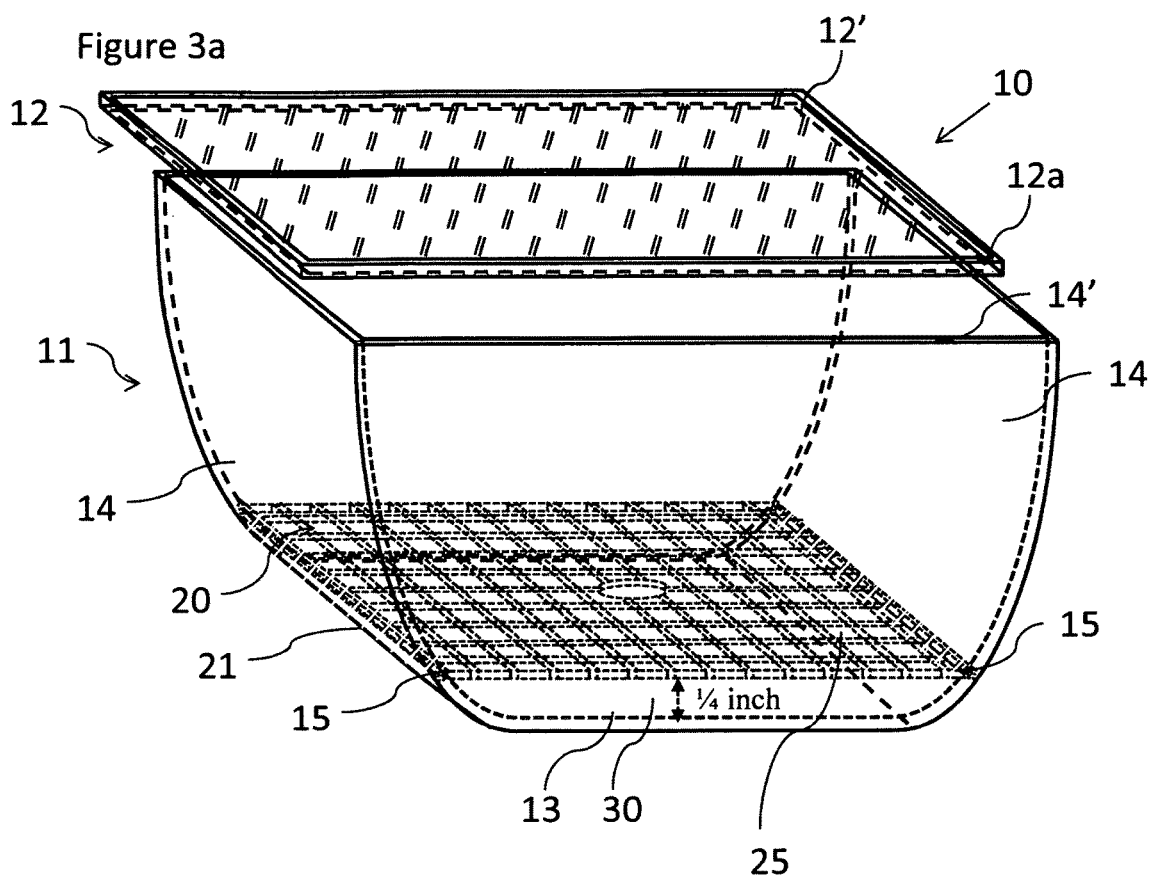
FIG. 3a is a view of a first embodiment of the subject food storage container and/or strainer device fully assembled and ready for use.
Figure 3B:
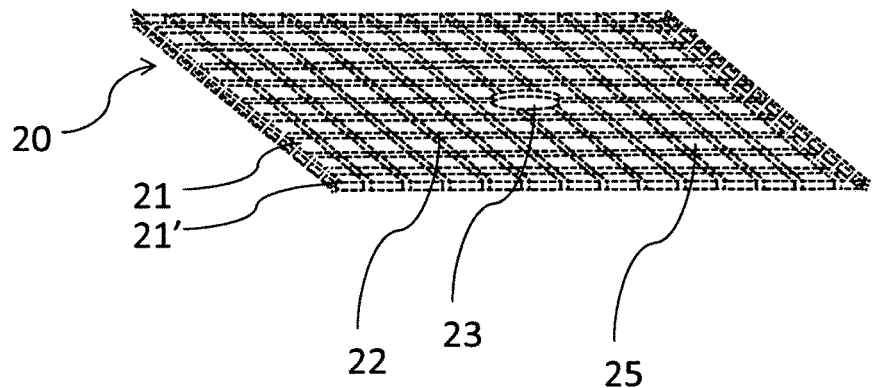
Figure 3C:
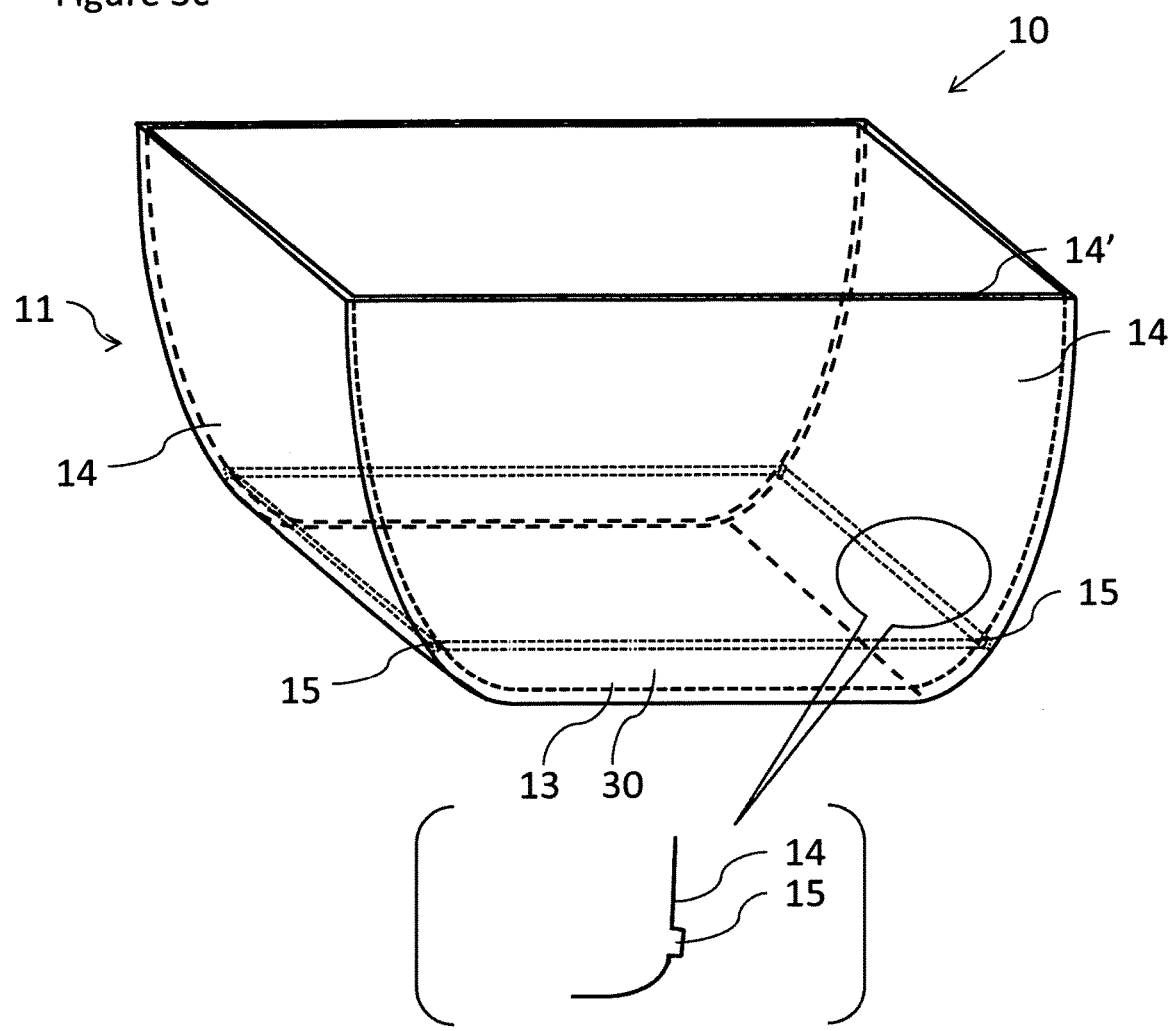
FIG. 3c is a view of the container/vessel of FIG. 3a with the liquid strainer divider removed from the container showing the side walls and securing means.

FIGS. 3a-3c illustrate an embodiment of the 'Fresh Fit Vessel, shown generally at 10. FIG. 3a shows the container with strainer generally fully assembled and ready for use. FIG. 3b shows an embodiment of the liquid strainer divider, herein shown as a grate or strainer, removed from the container. FIG. 3c shows the container/vessel with the liquid strainer divider removed from the container showing the side walls and securing means. Referring to FIGS. 3a-3c, the container with strainer 10 is generally formed as a container 11 with a lid 12. Lid 12 is appointed to seal container 11 and prevent leakage from the container 11. Container 11 is preferably a plastic container for food storage, and it can come in a plethora of different shapes and sizes. Herein container 11 is generally shown as a rectangular or square container. Container 11 is constructed with a bottom wall 13 and side walls 14. Side walls 14 terminate at a rim or top edge 14' that includes a lip that is adapted to be snapped into a groove 12a within lid 12 for closing and sealing container 11. Side walls 14 include a securing means 15 that is adapted to fit and securingly receive and house a liquid strainer divider 20. Preferably, securing means 15 in side walls 14 is constructed as a groove in at least a portion of each of the side walls 14. More preferably, the groove extends along the interior perimeter of the side walls 14 as a continuous groove circumferentially running continuously along the entire side walls 14. The securing means 15/groove is formed as a notch or groove that is adapted to receive a rim 21 of the liquid strainer divider 20. This securing means 15/circumferentially extending groove is located approximately ¼ inch from the bottom wall 13 of container 11. It is noted that the height from the bottom wall 13 of the container 11 to the securing means 15/circumferentially extending groove may be adjusted depending on the volume of the container itself. That is to say, for smaller containers the distance may be less than ¼ inch, while for larger containers, the distance may be greater than ¼ inch, ranging instead from ¼ inch to 3 inches for example.

The liquid strainer divider, herein shown as a grate or strainer, shown at 20 is adapted to be removably received within container 11 by way of the securing means 15/circumferentially extending indenture. The liquid strainer divider, or strainer 20 in this embodiment, is formed having a main body portion 22 with a removal means 23 centrally located therein, with the body portion 22 terminating at a perimeter 21' with a perimeter rim 21. Perimeter rim 21 and perimeter 21' thereof are snapped and received securely and tightly fit within the securing means 15/circumferentially extending groove of container 11. Removal means 23 of strainer 20 is provided as a tab or finger hole wherein a user pulls upward thereon to remove or snap the strainer 20 from the securing means 15/circumferentially extending groove of the container for removal of the strainer 20 from the container 11. In another embodiment the removal means 23 may instead be pull tabs located on or near perimeter rim 21 and/or perimeter 21'. Preferably perimeter rim 21 and perimeter 21' thereof are composed of a resilient yet flexible material so that the perimeter rim 21 and perimeter 21' can be compressed and deformed to snap into/out of the securing means 15/circumferentially extending indenture. The main body portion 22 may be composed of the same material, or may be composed of a more rigid material. Materials contemplated include polymeric materials, rubber, and/silicone materials or combinations thereof. Strainer 20 is composed of a plurality of straining holes or apertures 25 and functions to separate liquid that comes off from the stored food. The liquid is then received and held in a bottom cavity 30 of container 11. Lid 12 is preferably aerated for circulation by way of at least one aeration aperture 12'; preferably there are a plurality of aeration apertures 12', as illustrated in the figure.

FIG. 4 illustrates an embodiment of the 'Fresh Fit Vessel, shown generally at 200, wherein the container is constructed as a round or oval bowl, formed as a container 211 with a lid 212. Like the previous embodiment, container 211 is constructed with a bottom wall 213 and side walls 214 that terminate at a rim or top edge 214' including a lip or closure that is adapted to be snapped into a groove 212a within lid 212 for closing the container 211. Side walls 214 include a securing means 215 adapted to fit and securing receive and house a liquid strainer divider 220. Preferably, securing means 215 in side walls 214 are constructed as a groove in at least a portion of each of the side walls 214. More preferably, the groove extends along the interior perimeter of the side walls 214 as a continuous groove circumferentially running continuously along the entire side walls 214. The securing means 215/groove is formed as a notch or groove that is adapted to receive a rim 221 of the liquid strainer divider 220. This securing means 215/circumferentially extending groove is located approximately ¼ inch from the bottom wall 213 of container 211. It is noted that the height from the bottom wall 213 of the container 211 to the securing means 215/circumferentially extending groove may be adjusted depending on the volume of the container itself as set forth hereinabove. The liquid strainer divider 220 is formed as discussed above regarding FIGS. 3a-3c.

FIGS. 5a-5e illustrate another embodiment of the container with strainer device, shown generally at 500. Herein, the liquid strainer divider 520 is constructed having a plurality of shallow interconnected peaks and valleys (i.e. similar to an egg-carton construct). Container 511 has a lid 512, a bottom wall 513 and side walls 514 that terminate to a rim or top edge 515 including a lip or closure that is adapted to be snapped into a groove 512a within lid 512. Side walls 514 may include a securing means 515 adapted to fit and securing receive and house a liquid strainer divider 520. Preferably, securing means 515 in side walls 514 is constructed as a groove in at least a portion of each of the side walls 514. More preferably, the groove extends along the interior perimeter of the side walls 514 as a continuous groove circumferentially running continuously along the entire side walls 514. The securing means 515/groove is formed as a notch or groove that is adapted to receive a rim 521 of the liquid strainer divider 520. A liquid strainer divider 520 is adapted to be removably received within container 511 by way of the securing means 515/circumferentially extending indenture.

Figure 5A:
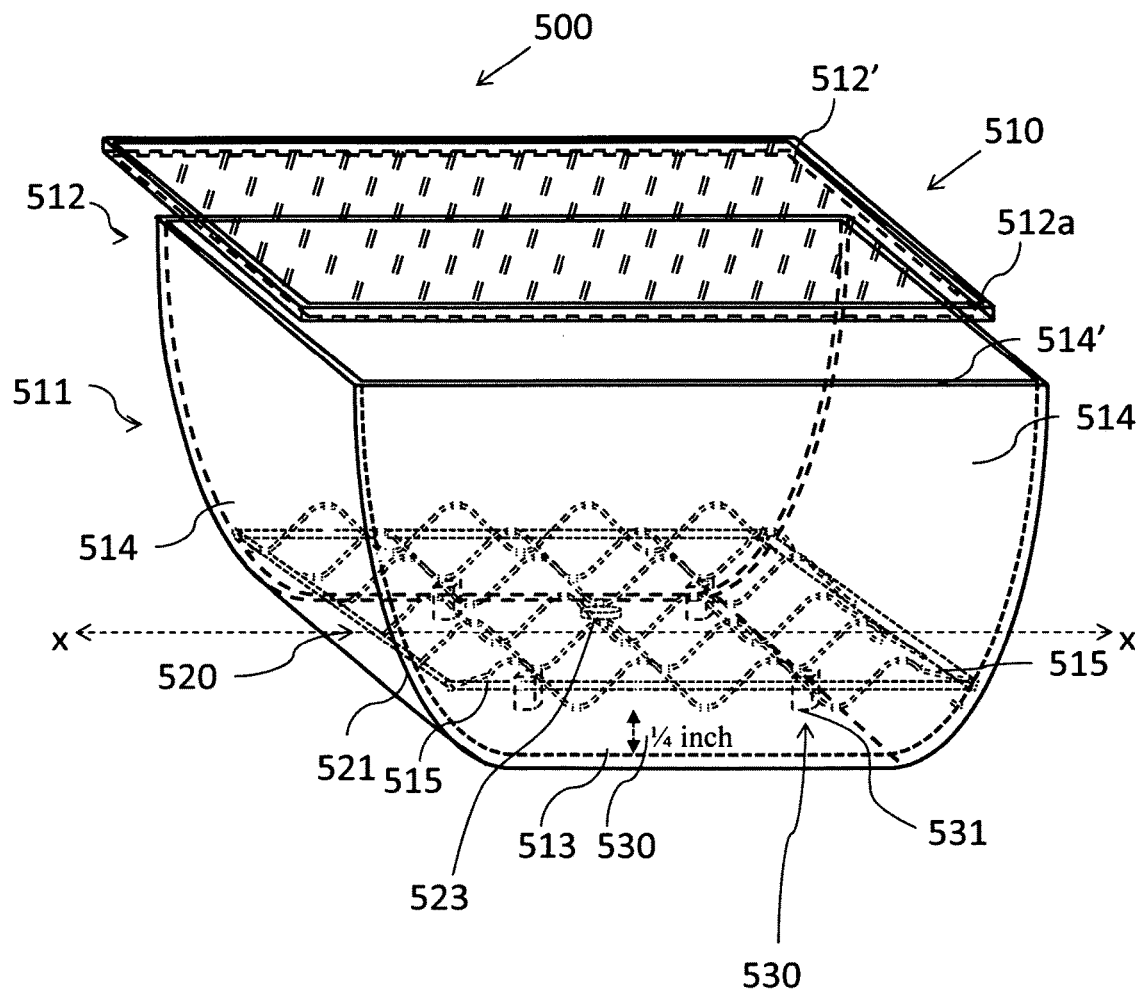
FIG. 5a is a view of another embodiment of the subject food storage container and/or strainer device generally fully assembled and ready for use.
Figure 5B:
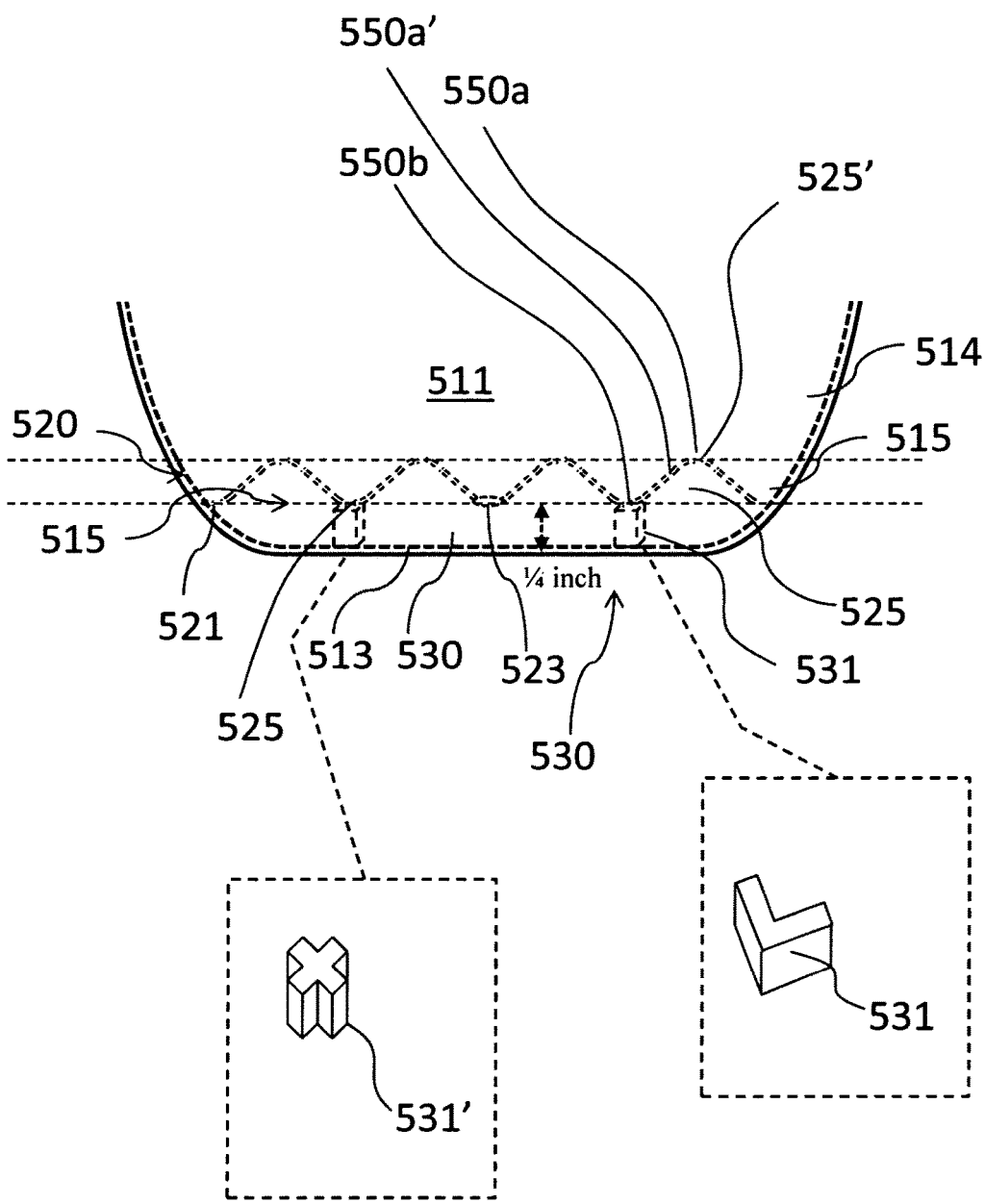

In the embodiment shown, stability portion 530 is provided on the underside of the liquid strainer divider 520. Preferably, the stability portion 530 comprises at least two support legs 531. More preferably, as shown, four support legs 531 are provided. Wherein the support legs 531 are provided there is no need for the securing means 515; and the liquid strainer divider 520 can be added to a plethora of different containers. Preferably, the support legs 531 are formed as shallow portions having an L-shaped configuration extending from an underside of said strainer divider, as shown in FIG. 5b so as not to interfere with the apertures for liquid straining. Most preferably, the support legs 531 are formed having a plus +shape or construct as shown at 531' in FIG. 5b arranged for non-interference with the holes/apertures for drainage. Preferably, the support legs 531 are composed of a flexible deformable material so that the divider can be pressed downward in the container. This material is preferably a silicone material, foam, rubber, or flexible plastic. The support legs 531 may be composed of a polymeric material. Alternatively, the support legs 531 can be composed of a rigid material, such as a hard plastic or hard rubber material.

The liquid strainer divider 520 is formed herein as a grate or strainer adapted to be removably received within container 511 by way of the securing means 515/circumferentially extending groove. Main body portion 522 of the divider 520 includes a removal means 523 centrally located therein. Main body portion 522 terminates at a perimeter 521' with a perimeter rim 521. Perimeter rim 521 and perimeter 521' thereof are snapped and received securely and tightly fit within the securing means 515/circumferentially extending groove of container 511.

Removal means 523 of strainer 520 is provided as a tab or finger hole wherein a user pulls upward thereon to remove or snap the strainer 520 from the securing means 515. In another embodiment the removal means 523 may instead be pull tabs or an arched aperture located on or near perimeter rim 521 and/or perimeter 521', as shown in FIG. 5d at 523'.

Preferably perimeter rim 521 and perimeter 521' thereof are substantially flat (as opposed to the wave construct of main body portion 522) and composed of a resilient yet flexible material so that the perimeter rim 521 and perimeter 521' can be compressed and deformed to snap into/out of the securing means 515. The main body portion 522 may be composed of the same material, or may be composed of a more rigid material. Materials contemplated include polymeric materials, rubber, and/silicone materials or combinations thereof.

Strainer 520 is formed having a plurality of interconnected shallow peaks 550a and valleys 550b. Preferably, each peak 550a is formed as a convex arched curve with sloping walls 550a' terminating to valleys 550b that are conversely concave arched curves so as to form an interconnected waved structure (see FIG. 5b).

Preferably, each valley 550b includes at least one aperture or hole 525 therein so that liquid flows from the convex arched curve of peak 550a down sloping walls 550a' and into valley 550b, wherein the liquid flows through aperture 525 into the bottom cavity 530 of container 511. In another embodiment, peaks 550a also include at least one aperture or hold 525' located centrally within each peak 550a. Alternatively, sloping walls 550a' may also include a plurality of apertures therein (not shown). Preferably sloping walls 550a' are smooth slippery walls compelling liquid to flow and bead so as to travel downward into valleys 550b and through apertures 525 therein located.

Figure 5C:
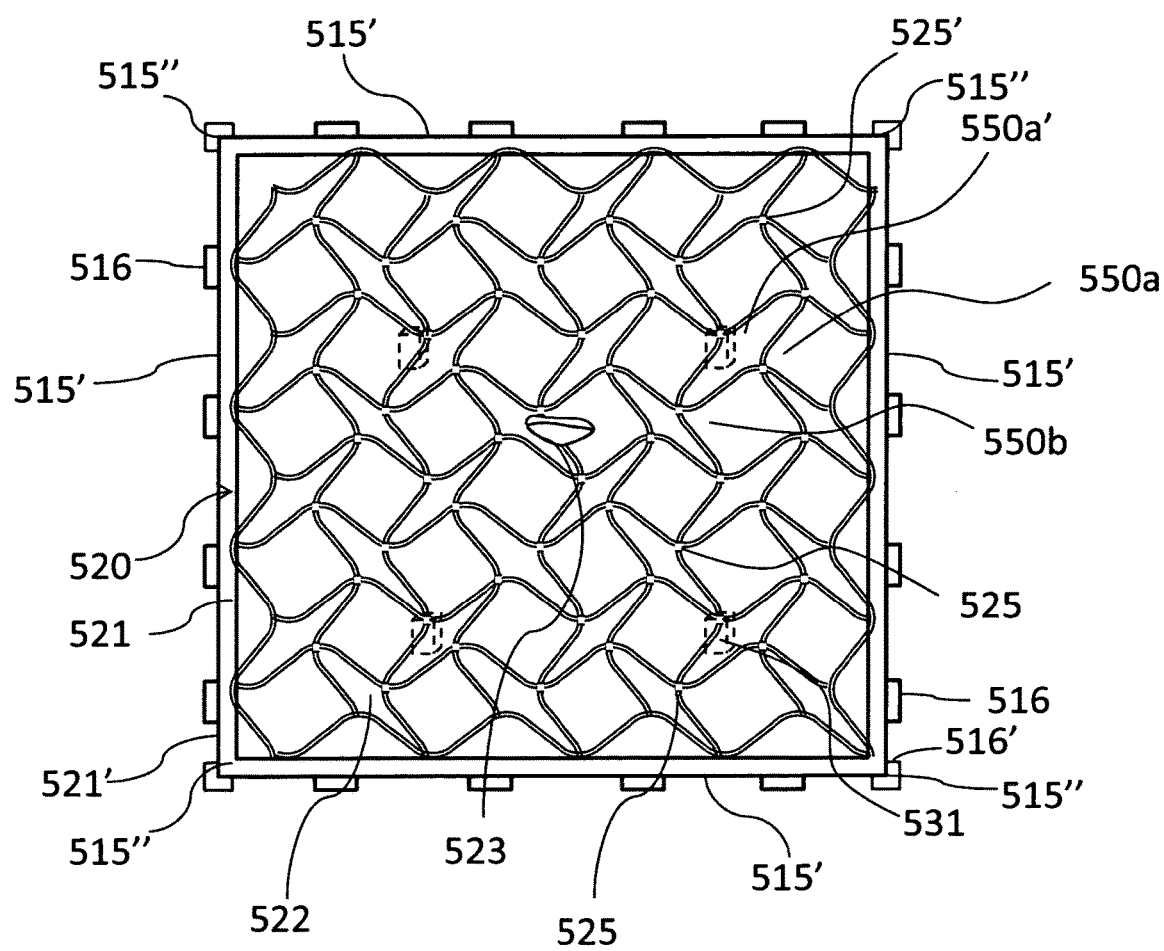
Figure 5D:
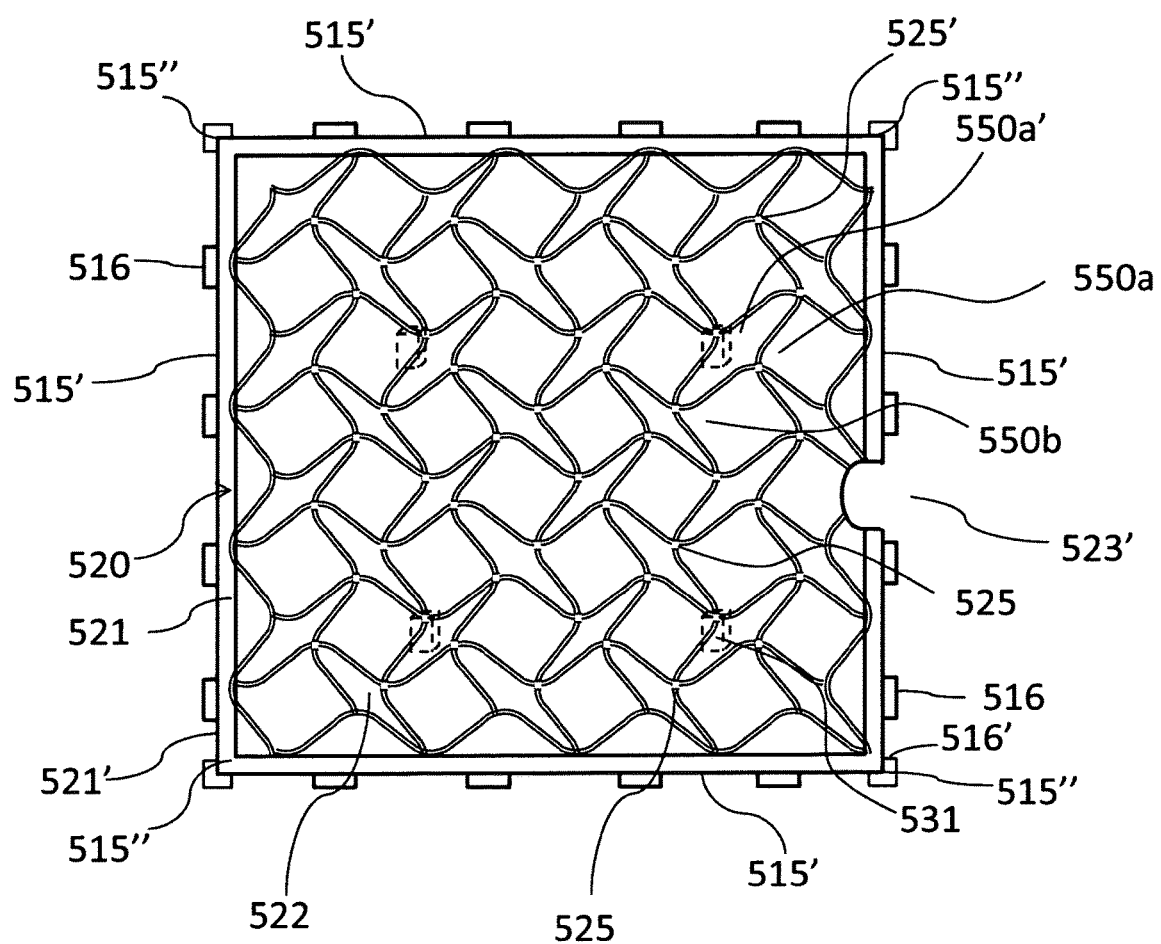
FIG. 5d is a top view of the liquid strainer divider insert removed from the container of FIG. 5a showing an alternative embodiment wherein the liquid strainer divider includes a removal means formed as an arched aperture located in the perimeter rim.

As best viewed in FIG. 5c, the perimeter rim or top edge 515 comprises side wall perimeters 515' and corner perimeters 515". At least a portion of the perimeter rim 515 preferably comprises at least one side extension shown on side wall perimeters 515' at 516. Side extensions may also be provided on each corner as shown at 516'. The side extension is shown as a plurality of side extensions 516 that are formed as discrete portions appending from the perimeter rim 515. In another embodiment, or alternatively, the side extensions 516 may extend along at least a portion of each of the corner perimeters 515" only rather than along the side wall perimeters 515'. In another embodiment, side extensions 516 extend along at least a portion of the side wall perimeters 515' only, as shown.

Figure 5E:
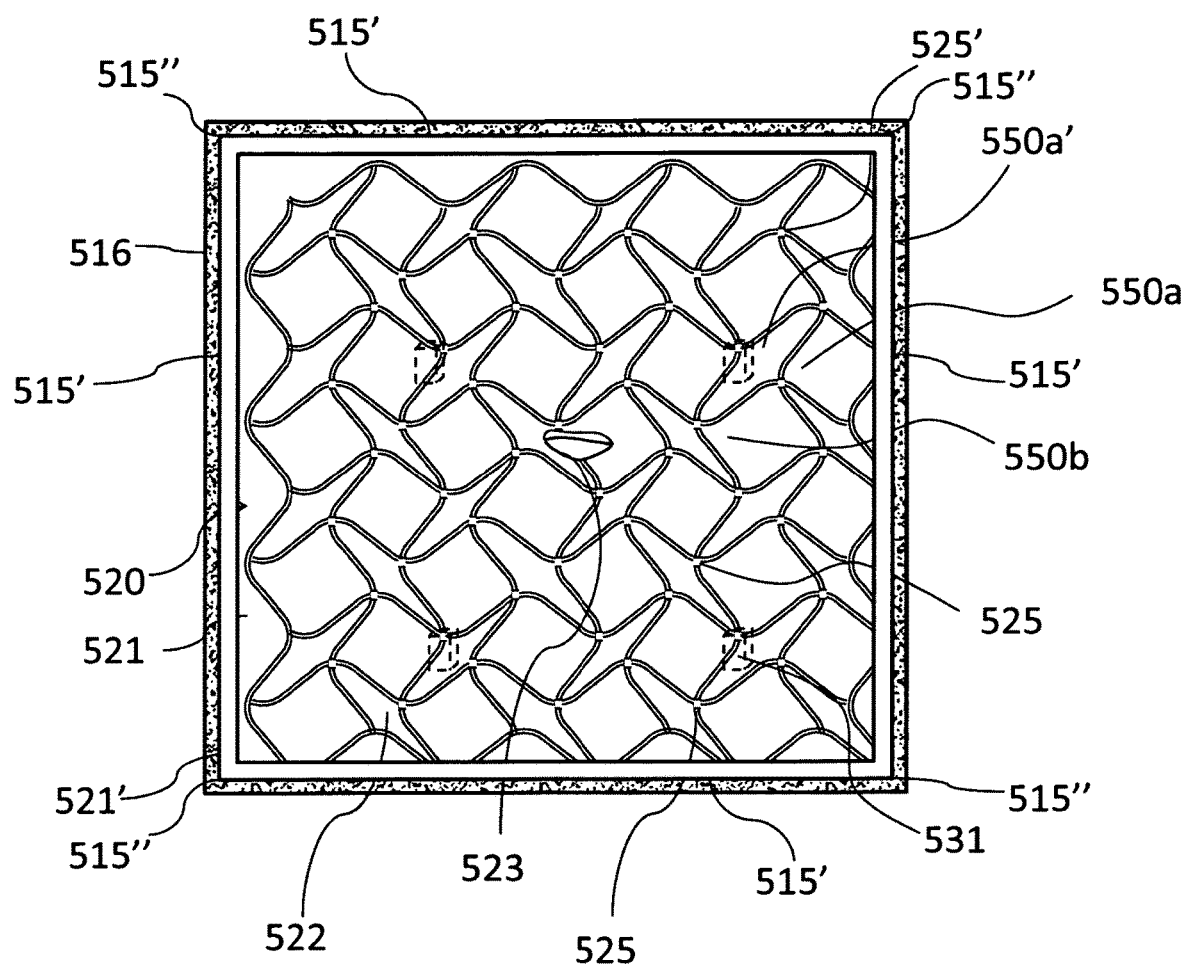

In an alternative embodiment shown in FIG. 5e, the side extension 516 may be formed as a unilateral continuous portion that extends substantially along the side wall perimeters 515' and along the corner perimeters 515" so that the side extensions 516 circumferentially run continuously and uninterrupted along the perimeter rim 515. Preferably, the side extensions 516 are composed of a flexible deformable material so that the perimeter rim can be compressed and deformed to snap in and out of the container. The liquid strainer divider main body is composed of a polymeric, rubber, and/or silicone material or combinations thereof.

Preferably the subject strainer divide is composed of a heat resistant material so that the strainer divider can be utilized in an oven. In another embodiment, the strainer divider may be composed of a polymeric material with a cooling liquid center wherein the strainer divider can be placed within a freezer and later placed within a container to provide a cooling effect as well as a strainer effect.

Figure 6A:
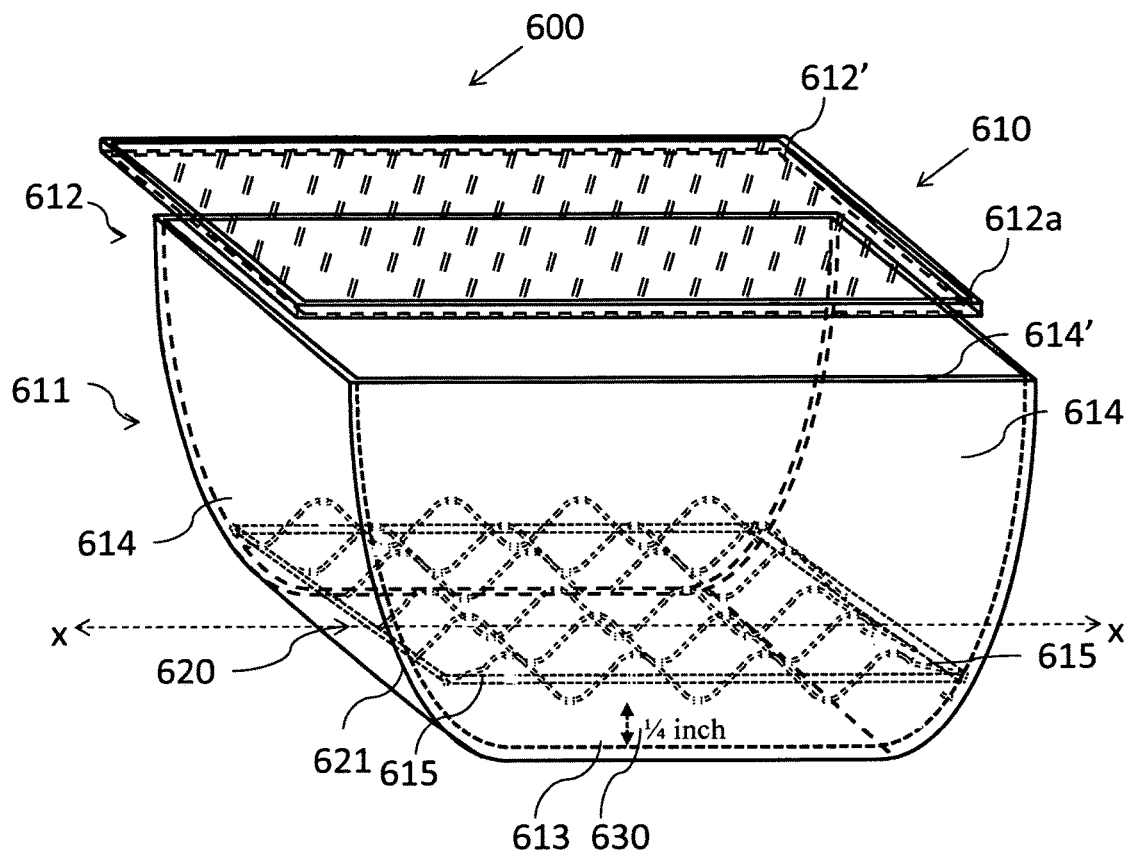
FIG. 6a is a view of another embodiment of the subject food storage container and/or strainer device generally fully assembled and ready for use.
Figure 6B:
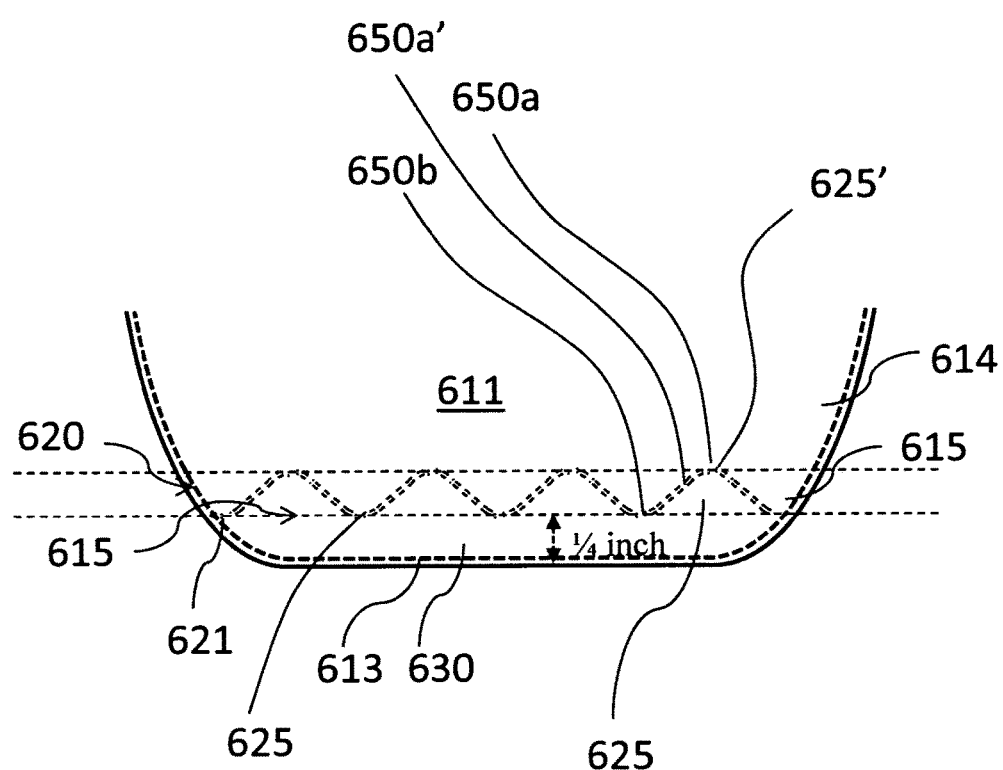
Figure 6C:
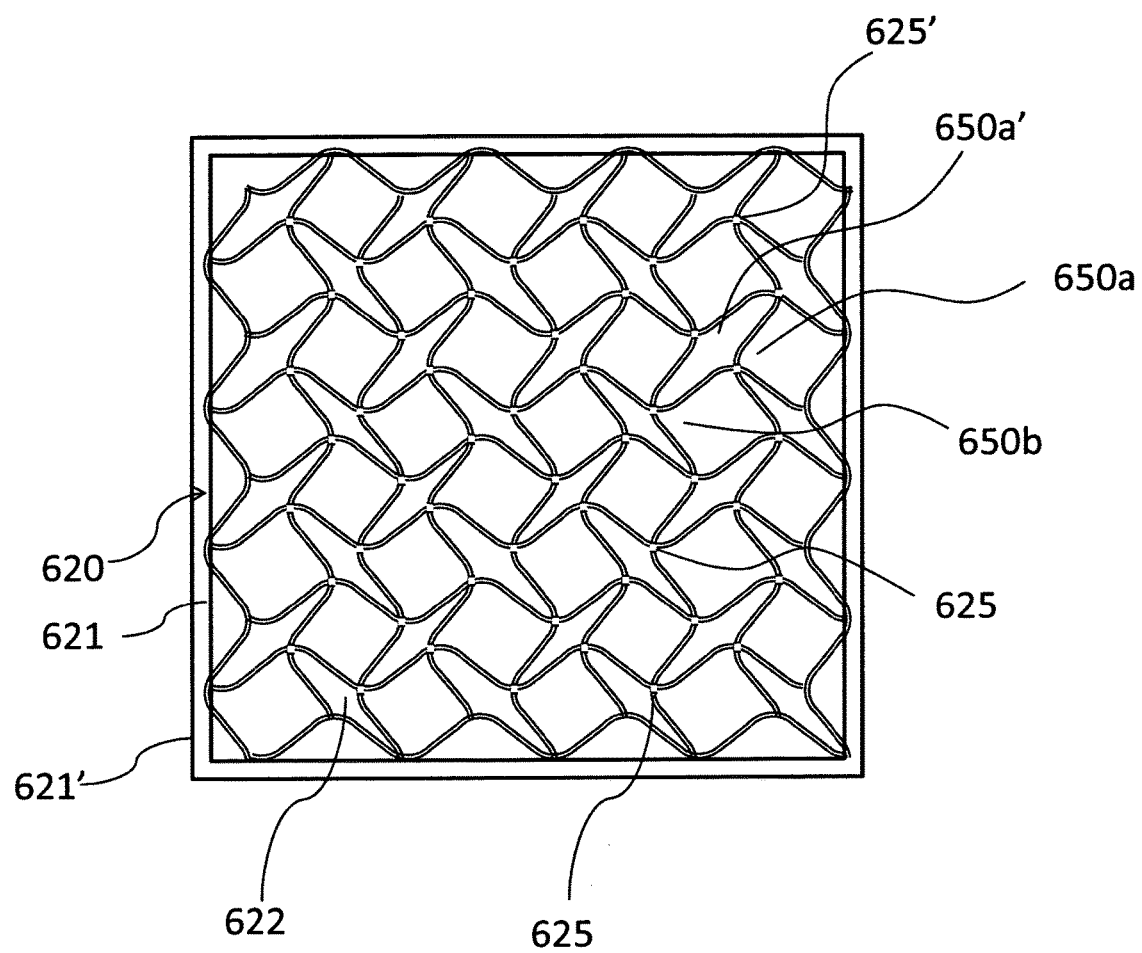

FIGS. 6a-6c illustrate an embodiment of the container with strainer device, shown generally at 600. Herein, the liquid strainer divider 620 is constructed having a plurality of shallow interconnected peaks and valleys (i.e. similar to an egg-carton construct). Container 611 has a lid 612, a bottom wall 613 and side walls 614 that terminate to a rim or top edge 615 including a lip or closure that is adapted to be snapped into a groove 612a within lid 612. Side walls 614 may optionally include a securing means 615 adapted to fit and securing receive and house a liquid strainer divider 620. Preferably, securing means 615 in side walls 614 is constructed as a groove in at least a portion of each of the side walls 614. More preferably, the groove extends along the interior perimeter of the side walls 614 as a continuous groove circumferentially running continuously along the entire side walls 614. The securing means 615/groove is formed as a notch or groove that is adapted to receive a rim 621 of the liquid strainer divider 620. A liquid strainer divider 620 is adapted to be removably received within container 611 by way of the securing means 615/circumferentially extending indenture.

The liquid strainer divider 620 is formed herein as a grate or strainer adapted to be removably received within container 611 by way of the securing means 615/circumferentially extending groove. Main body portion 622 of the divider 620 includes a removal means 623 centrally located therein. Main body portion 622 terminates at a perimeter 621' with a perimeter rim 621. Perimeter rim 621 and perimeter 621' thereof are snapped and received securely and tightly fit within the securing means 615/circumferentially extending groove of container 611.

Removal means 623 of strainer 620 is provided as a tab or finger hole wherein a user pulls upward thereon to remove or snap the strainer 620 from the securing means 615. In another embodiment the removal means 623 may instead be pull tabs located on or near perimeter rim 621 and/or perimeter 621'.

Preferably perimeter rim 621 and perimeter 621' thereof are substantially flat (as opposed to the wave construct of main body portion 622) and composed of a resilient yet flexible material so that the perimeter rim 621 and perimeter 621' can be compressed and deformed to snap into/out of the securing means 615. The main body portion 622 may be composed of the same material, or may be composed of a more rigid material. Materials contemplated include polymeric materials, rubber, and/silicone materials or combinations thereof.

Strainer 620 is formed having a plurality of interconnected shallow peaks 650a and valleys 650b. Preferably, each peak 650a is formed as a convex arched curve with sloping walls 650a' terminating to valleys 650b that are conversely concave arched curves so as to form an interconnected waved structure (see FIG. 6b).

Preferably, each valley 650b includes at least one aperture or hole 625 therein so that liquid flows from the convex arched curve of peak 650a down sloping walls 650a' and into valley 650b, wherein the liquid flows through aperture 625 into the bottom cavity 630 of container 611. In another embodiment, peaks 650a also include at least one aperture or hold 625' located centrally within each peak 650a. Alternatively, sloping walls 650a' may also include a plurality of apertures therein (not shown). Preferably sloping walls 650a' are smooth slippery walls compelling liquid to flow and bead so as to travel downward into valleys 650b and through apertures 625 therein located.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A strainer divider, comprising:
  a. a liquid strainer divider having a main body portion with a plurality of closely arranged apertures operative to separate liquids from food, and said body portion terminating at a perimeter with a perimeter rim;
  b. said perimeter rim and perimeter of said main body portion of said liquid strainer divider being adapted to be received and abut against walls of a container and said plurality of apertures of said liquid strainer divider functioning to separate liquid to a bottom wall of said container;
  c. said liquid strainer divider having an egg carton structure comprising a plurality of interconnected peaks and valleys, wherein each of said peaks is formed as a convex arched curve with sloping walls terminating to valleys that surround each peak and are conversely concave arched curves so as to form an interconnected waved structure;
  d. each of said valleys having at least one aperture or hole therein;
  e. at least one stability portion extending from an underside of said strainer divider; and
  f. said main body portion comprising a removal means; wherein said liquid strainer divider functions to separate liquid to said bottom wall of said container.

2. A strainer divider as recited by claim 1, wherein said each of said peaks includes at least one aperture or hole therein.

3. A strainer divider as recited by claim 1, wherein said at least one stability portion comprises at least two support legs.

4. A strainer divider as recited by claim 3, wherein said at least one stability portion comprises four support legs.

5. A strainer divider as recited by claim 3, wherein said support legs extend from an underside of said strainer divider.

6. A strainer divider as recited by claim 3, wherein said support legs are composed of a flexible deformable material.

7. A strainer divider as recited by claim 1, wherein said perimeter rim comprises side wall perimeters and corner perimeters, and wherein at least a portion of said perimeter rim comprises at least one side extension appending from said perimeter rim.

8. A strainer divider as recited by claim 7, wherein a plurality of side extensions is provided.

9. A strainer divider as recited by claim 7, wherein said at least one side extension only extends along at least a portion of each of said corner perimeters.

10. A strainer divider as recited by claim 7, wherein said at least one side extension only extends along at least a portion of said side wall perimeters.

11. A strainer divider as recited by claim 7, wherein said at least one side extension is formed as a unilateral continuous portion that extends substantially along said side wall perimeters and along said corner perimeters so that said at least one side extension circumferentially runs continuously and uninterrupted along said perimeter rim.

12. A strainer divider as recited by claim 7, wherein said at least one side extension is composed of a flexible deformable material.

13. A strainer divider as recited by claim 7, wherein said at least one side extension is composed of a polymeric material.

14. A strainer divider as recited by claim 1 composed of a heat resistant material so that said strainer divider can be utilized in an oven.

15. A strainer divider as recited by claim 1 comprised of a polymeric material with a cooling liquid center wherein said strainer divider can be placed within a freezer and later placed within a container to provide a cooling effect as well as a strainer effect.

16. A container with a strainer divider as recited by claim 1, wherein said removal means is formed as a centrally located aperture and said aperture is sized and adapted to accommodate a finger for removal of said liquid strainer divider.

17. A container with a strainer divider as recited by claim 1, wherein said removal means is formed as an arched aperture located in said perimeter rim and adapted to accommodate a finger for removal of said liquid strainer divider.

18. A container with a strainer divider as recited by claim 1, wherein said perimeter rim is composed of a resilient flexible material so that said perimeter rim can be compressed and deformed to snap in and out of said container.

19. A container with a strainer divider as recited by claim 1, wherein said liquid strainer divider main body is composed of a polymeric material, rubber material, silicone material or combinations thereof.

20. A container with a strainer divider as recited by claim 1, wherein said support legs are composed of a rigid material.

21. A strainer divider, comprising:
  a. a liquid strainer divider having a main body portion with a plurality of closely arranged apertures operative to separate liquids from food, said body portion terminating at a perimeter with a perimeter rim;
  b. said perimeter rim and perimeter of said main body portion of said liquid strainer divider being adapted to be received and abut against walls of a container, said plurality of apertures of said liquid strainer divider functioning to separate liquid to a bottom wall of said container;
  c. said main body portion of said liquid strainer divider having an egg carton structure comprising a plurality of interconnected peaks and valleys, wherein each peak is formed as a convex arched curve with sloping walls terminating to valleys that surround each peak and are conversely concave arched curves so as to form an interconnected waved structure;
  d. each of said valleys having at least one of said aperture or hole therein;
  wherein said liquid strainer divider functions to separate liquid to said bottom wall of said container.

* * * * *